Nov. 7, 1967 E. R. STOVER 3,351,690
HEAT TREATING PYROLYTIC GRAPHITE AND BORON NITRIDE BODIES WITH
SIMULTANEOUS APPLICATION OF MULTIAXIAL TENSION
Filed April 18, 1962 2 Sheets-Sheet 1
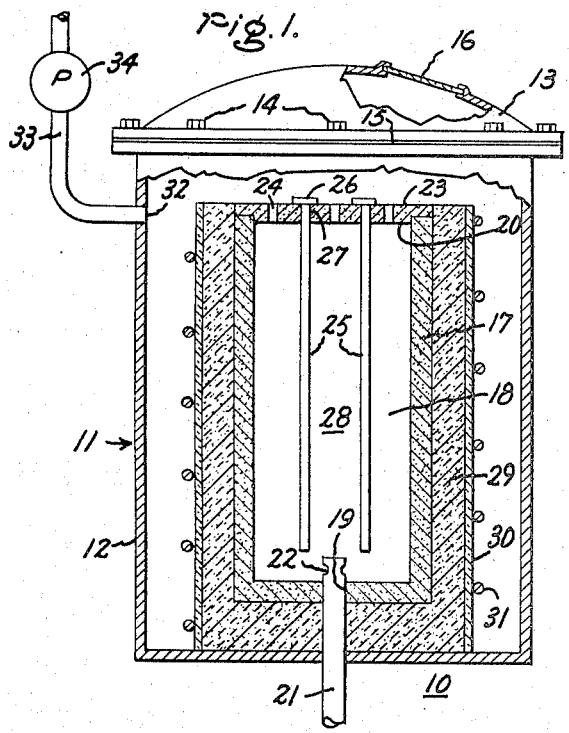
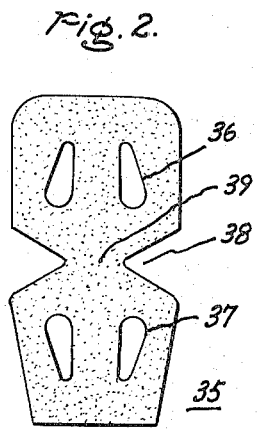
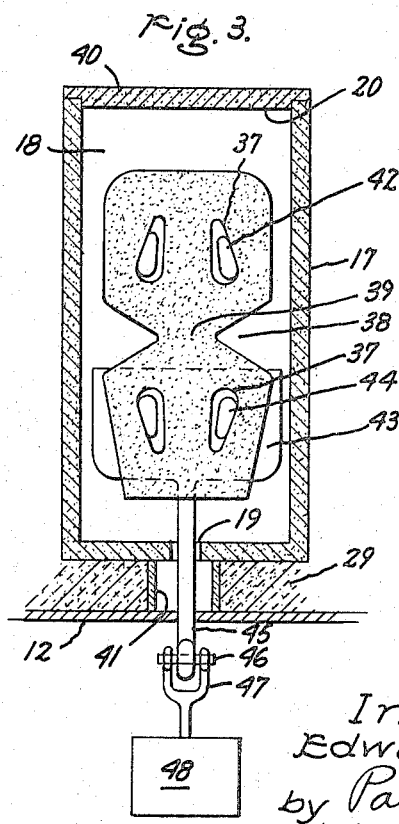
Inventor:
Edward R. Stover,
by Paul R. Webb, II
His Attorney.

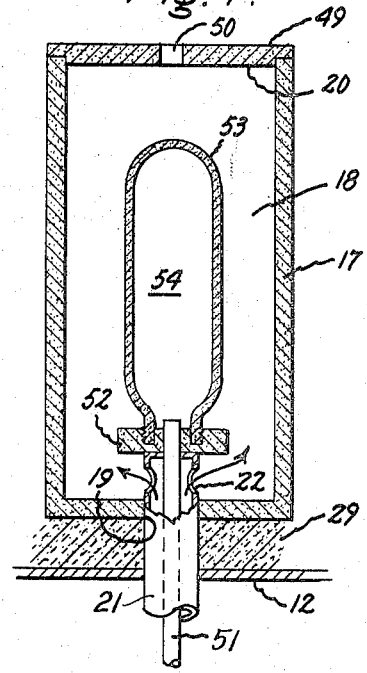
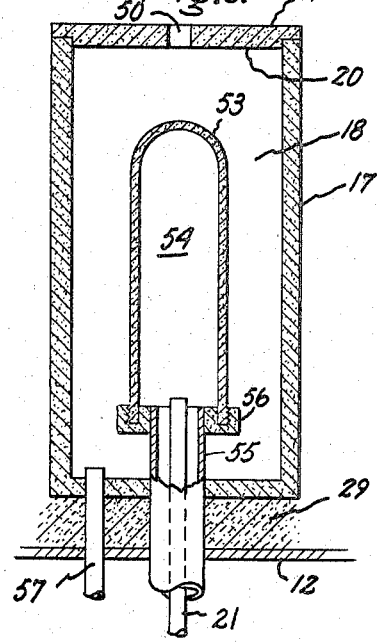

United States Patent Office 3,351,690
Patented Nov. 7, 1967

3,351,690
HEAT TREATING PYROLYTIC GRAPHITE AND BORON NITRIDE BODIES WITH SIMULTANEOUS APPLICATION OF MULTIAXIAL TENSION
Edward R. Stover, Schenectady, N.Y., assignor to General Electric Company, a corporation of New York
Filed Apr. 18, 1962, Ser. No. 188,477
4 Claims. (Cl. 264—81)

This invention relates to methods of forming articles and more particularly to forming articles from bodies selected from the group consisting of pyrolytic graphite and pyrolytic boron nitride.

Pyrolytic graphite is defined as a material made from carbonaceous gases by thermal decomposition or forming carbonaceous material by evaporation and deposition on a surface. In pyrolytic graphite, planar graphite crystallites have a preferred orientation and are arranged so that their layers are generally parallel to the deposition surface. Such graphite has been heated at temperatures in the range of 2500° C. to 3200° C. to increase the preferred orientation and crystalline perfection of the material. Such heating results in consequent enchancement of thermal and electrical conductivity, density, and elastic modulus. Superimposition of a uniaxial tension in the plane of the deposition in the above temperature range, which is also referred to as "hot working," results in an improved mechanical strength, preferred orientation and development of crystalline perfection at slightly lower temperatures than can be obtained by annealing in the absence of stress.

It would be desirable to provide improved methods of forming articles from bodies selected from the group consisting of pyrolytic graphite and pyrolytic boron nitride. Such articles would be in the form of plates, thin-walled tubes and bulbs, and thin films or membranes. These articles would have application as gas impermeable membranes in heat exchangers, wrapping material, and bags. My invention is directed to a method of forming an article from a body selected from the group consisting of pyrolytic graphite and pyrolytic boron nitride wherein the body is subjected to a temperature of at least 2500° C. and stretched simultaneously in at least two directions. My method of applying biaxial tension, as contrasted with previous uniaxial tension, results in an article with superior crystalline perfection, preferred orientation and less weakening structural defects.

It is an object of my invention to provide a method of forming an article from a body selected from the group consisting of pyrolytic graphite and pyrolytic boron nitride.

It is another object of my invention to provide a method of forming an annealed article with a more perfectly oriented structure.

It is a further object of my invention to provide an article from a body selected from the group consisting of pyrolytic graphite and pyrolytic boron nitride.

In carrying out my invention in one form, a method of forming an article comprises subjecting a relatively thin body having two major surfaces, which body is made of material selected from the group consisting of pyrolytic graphite and boron nitride to a temperature of at least 2500° C., and simultaneously applying to said body force generating a biaxial tension in the plane of deposit in the case of flat plates (or in at least one major surface in the case of a hollow body) thereby transforming the body to an annealed article with a more perfectly oriented structure.

These and various other objects, features, and advantages of the invention will be better understood from the following description taken in connection with the accompanying drawing in which:

FIGURE 1 is a sectional view of apparatus for forming a body;
FIGURE 2 is an elevational view of a body which was formed initially in the apparatus of FIGURE 1;
FIGURE 3 is a sectional view of a portion of apparatus for forming an article in accordance with my invention;
FIGURE 4 is a sectional view of a portion of modified apparatus for forming an article; and
FIGURE 5 is a sectional view of a portion of further modified apparatus for forming an article.

In FIGURE 1, apparatus is shown generally at 10 which comprises a chamber 11 having a lower body portion 12 and a cover 13 which is hinged to the lower body portion by means of bolts 14 and employs an O ring 15 therebetween. Viewing window 16 is provided in cover portion 13 to view the operation and to read an optical pyrometer (not shown). An enclosure 17 of graphite or other high temperature material defines a chamber 18 communicating with a bottom opening 19 and a top opening 20. A feed line 21 is connected to a carbonaceous material source (not shown) and extends therefrom through the bottom wall of body portion 12 and opening 19 in enclosure 17 to communicate with chamber 18 by means of outlet openings 22. Opening 20 of enclosure 17 is provided with a cover 23 having openings 24 therein for removal of fumes.

A pair of graphite plates 25 are hung within enclosure 17 by means of a flange 26 at one end of each sheet 25. Flange 26 of each plate 25 is supported on cover 23 while plate 25 extends through an opening 27 in cover 23 to be suspended within chamber 18 of enclosure 17. Passages 28 are defined by chamber 17 between adjacent plates 25 and between each plate 25 and the associated wall of enclosure 17. Suitable insulation such as carbon black 29 surrounds enclosure 17 and is held in position by a quartz or asbestos paper cylinder 30. Conventional induction heating coils 31 surround cylinders 29 to provide heat for enclosure 17, plates 25 and chamber 18 including passages 28 thereof during the deposition process. Body portion 12 of chamber 11 is also provided with an outlet 32 to which is connected a line 33 associated with a vacuum pump 34 to reduce the pressure in chamber 11.

In the operation of apparatus 10 shown in FIGURE 1, a pair of graphite plates 25 are supported by means of their respective flanges 26 on cover 23 within enclosure 17. In this manner, passages 28 are provided within chamber 18 between adjacent plates 25 and between each plate 25 and its associated wall of enclosure 17. Cover 13 is bolted to lower body portion 12 of chamber 11. The chamber atmosphere is reduced preferably to the lowest obtainable vacuum prior to admitting a gas although the deposition process can be carried out over a wide range of chamber pressures such as 0.5 mm. to 76 mm. of mercury, at various gas flow rates, such as 20 to 150 cubic feet per hour. Power is supplied to induction coil 31 to bring the temperature of enclosure 17, plates 25 and chamber 18 up to a temperature in the range of 1700° C. to 2500° C. prior to admitting a gas. A carbonaceous gas, such as methane, is fed through suitable metering devices (not shown) and feed line 21 with its associated outlet openings 22 into chamber 18 including passages 28. The carbonaceous gas is decomposed to a carbon vapor which deposits on plates 25 and enclosure 17. This temperature range and the above pressure range are desirable to produce a fine-grained pyrolytic graphite body which is as free as possible from unusually large gas-phase-nucleated particles which create a microstructure known as coarse-grained "continuously nucleated" or "highly regenerative." Such large grains are detrimental in the annealing and hot working processes.

While induction coil 31 is used to heat the carbonaceous gas, enclosure 17, plates 25 and passages 28, the carbonaceous gas can be preheated from a separate heat source to the desired temperature to provide a carbon vapor which flows through feed line 21 into chamber 18. During the operation of apparatus 10, temperatures are recorded by an optical pyrometer (not shown) which is viewed through window 16 in cover 13 of apparatus 10.

After a desired thickness of a pyrolytic graphite body in the order of 10 mils to 100 mils is deposited on each side of each plate 25, the methane supply and heating are discontinued and apparatus 10 is allowed to cool to room temperature. The pressure is increased to atmospheric pressure and cover 13 is removed to provide access to enclosure 17. Plates 25 are removed from the enclosure by withdrawing the plates through the openings 27 in cover 23. A separate pyrolytic graphite body, each of which has two major surfaces, is then removed from each side of each of the plates 25.

In FIGURE 2 of the drawing, there is shown a pyrolytic graphite body 35 which was formed initially in the apparatus of FIGURE 1. The body shown has been machined to a configuration with an upper pair of apertures 36 and a lower pair of apertures 37 extending therethrough. A pair of identical cuts 38 have been made into opposite edges of the body to provide a portion 39 which will be transformed into an article.

In FIGURE 3 of the drawing, there is shown a portion of apparatus for forming an article from a body selected from the group consisting of pyrolytic graphite and pyrolytic boron nitride. This structure includes enclosure 17 defining chamber 18 and having bottom opening 19 and upper opening 20 closed by a cover 40. Enclosure 17 is positioned, for example, in apparatus 10 shown in FIGURE 1. Feed line 21 is removed from the apparatus. A quartz or asbestos cylinder 41 surrounds bottom opening 19 in enclosure 17 and the opening in lower body portion 12. A pair of pyrolytic graphite pins 42 which are mounted in the wall of enclosure 17 support body 35 thereon by being positioned in upper apertures 36 therein. A graphite yoke 43 is attached to the lower portion of body 35 by means of a pair of graphite pins 44 located in lower apertures 37 thereof. Stem 45 of yoke 43 carries a tungsten pin 46 therethrough. A pair of molybdenum wires 47 are attached to pin 46 and carry a weight 48 at the other end thereof.

In the operation of the apparatus shown in FIGURE 1 as modified by the structure of FIGURE 3, power is supplied to induction coil 30 to subject enclosure 17, chamber 18 and body 35 to a temperature range of 2500° C. to 3400° C. Weight 48 applies a biaxial tension to portion 39 of body 35 simultaneously during subjection of body 35 to a temperature in the above range. The combination of the above elevated temperature and biaxial tension transforms portion 39 of body 35 to an annealed graphite article with a more perfectly oriented structure. In view of the temperature requirements, it is desirable to employ an argon or neutral atmosphere to surround body 35 during its annealing. After portion 39 has transformed into an annealed graphite membrane, the temperature is discontinued and the apparatus is allowed to cool to room temperature. The argon atmosphere is flushed out of enclosure 17 and the apparatus is disassembled. Portion 39 is then removed from the remaining portion of body 35 to provide a graphite article.

In pyrolytic graphite, planar graphite crystallites have a preferred orientation and are arranged so that their layers are generally parallel to the deposition surface. Such graphite has been heated at temperatures in the range of 2500° C. to 3200° C. to increase the preferred orientation and crystalline perfection of the material. I found that annealing a pyrolytic graphite body in the absence of stress results in expansion in all directions in the plane of deposit associated with reorientation of the crystals. Such annealing provides partial straightening of the planes. Superimposition of an uniaxial tension during such annealing produces additional expansion substantially in one direction. Complete straightening of the planes with uniaxial tension is accomplished only in the event of a large plastic strain.

I discovered that annealing such a body with the application of biaxial tension, as distinct from uniaxial tension, results in an article with superior crystalline perfecton, preferred orientation and less weakening structural defects. Such biaxial tension promotes expansion in all directions, as opposed to additional expansion in only one direction by uniaxial tension, resulting in complete straightening of the planes. Such an article is formed by subjecting a body selected from the group consisting of pyrolytic graphite and pyrolytic boron nitride to a temperature in the range of 2500° C. to 3400° C. and simultaneously applying a biaxial tension to the body thereby transforming the body to an annealed article with a more perfectly oriented strucutre.

A more desirable article is produced from a pyrolytic graphite or pyrolytic boron nitride body which is made as free as possible from unusually large gase-phase-nucleated particles which create a coarse-grained continuously nucleated microstructure. The planes of the pyrolytic graphite body have a preferred orientation with more planes aligned parallel to the plane of deposit. When this body is subjected to a temperature range of at least 2500° C. and simultaneously stressed biaxially, the preferred orientation increases to result in a more perfectly or substantially perfect oriented structure. The orientation of the resulting article formed in accordance with this method is similar to a single crystal of the material. Additionally, the article has high strength and ductility in bending. The article produced in accordance with the above method results in a structure which can be employed as wrapping material.

In FIGURE 4, there is shown a portion of modified apparatus for forming an article from a body selected from the group consisting of pyrolytic graphite and pyrolytic boron nitride. This structure includes enclosure 17 with chamber 18 and having bottom opening 19 and upper opening 20 closed by a cover 49 with an opening 50 therein. Enclosure 17 is positioned, for example, in apparatus 10 shown in FIGURE 1. Feed line 21 is employed in the same manner as in FIGURE 1. An inlet line 51 for an inert gas, such as argon, extends through at least a portion of feed line 21 and extends through an aperture in the closed upper end thereof. An insulating member 52 of graphite is affixed to the closed upper end of feed line 21 and is provided with a central aperture therein whereby member 52 surrounds the outlet end of inlet line 51. A hollow porous member 53 having fine pores and in the form of a graphite tube having an open lower end and a closed upper end has its lower end threaded in member 52. In this manner, the outlet end of inlet line 51 extends into a chamber 54 defined by the inner wall of member 53.

In the operation of apparatus 10 shown in FIGURE 1 as modified by the structure shown in FIGURE 4, cover 13 is bolted to lower body portion 12 of chamber 11. The chamber atmosphere is reduced preferably to the lowest obtainable vacuum prior to admitting a gas although the deposition process can be carried out over a wide range of flow conditions as described above in connection with the operation of apparatus 10 in FIGURE 1. Power is supplied to induction coil 31 to bring the temperature of enclosure 17, chamber 18 and member 53 up to a temperature in the range of 1700° C. to 2500° C. prior to admitting a gas. As described above, a carbonaceous gas, such as methane, is fed through feed line 21 with its associated openings 22 into chamber 18. The gas is decomposed to a carbon vapor which deposits on the exterior surface of member 53 and the inner wall of enclosure 17 to produce a fine-grained pyrolytic graphite body.

After a pyrolytic graphite body in the order of 10 mils to 100 mils in thickness is deposited on the exterior surface of member 53, the methane supply is discontinued. The temperature is increased gradually from the deposition range of 1700° C. to 2500° C. to a range of 2500° C. to 3400° C. Simultaneously, an inert gas, such as argon, is pumped from its gas source (not shown) through inlet line 51 into the interior of member 53. The gas is diffused through the pores in member 53 to exert a pressure against the interior surface of the pyrolytic graphite body to apply a biaxial tension thereby transforming the body to an annealed article with a more perfectly oriented structure. The pressure of argon gas blows or forces the pyrolytic graphite body away from the exterior surface of member 53. The gas flow and heat are discontinued and the apparatus is allowed to cool to room temperature. The pressure is increased to atmospheric pressure and covers 13 and 49 are removed to provide access to enclosure 17. The article is then removed from member 53.

In FIGURE 5, there is shown a portion of a further modified apparatus for forming an article from a body selected from the group consisting of pyrolytic graphite and pyrolytic boron nitride. This structure includes enclosure 17 with chamber 18 and having bottom opening 19 and upper opening 20 closed by cover 49 with opening 50 therein. Enclosure 17 is positioned, for example, in apparatus 10 shown in FIGURE 1. Feed line 21 with an open outlet end is positioned within and extends from a gas outlet line 55. An apertured member 56 is affixed to the outlet end of line 55. The lower end of member 53 is threaded in member 56 whereby lines 21 and 55 are in communication with chamber 54. An inert gas, such as argon, is fed separately through line 21 by means of appropriate valves (not shown). Suitable valves (not shown) are also provided for outlet line 55. An inlet line 57 which is connected to a gas supply (not shown) extends through the bottom wall of body portion 12, insulation 29 and enclosure 17 to communicate with chamber 18 surrounding the exterior wall of member 53. Inlet line 57 supplies a gas, such as hydrogen or air, to chamber 18.

In the operation of apparatus 10 shown in FIGURE 1 as modified by the structure shown in FIGURE 5, cover 13 is bolted to lower body portion 12 of chamber 11. The chamber atmosphere is reduced preferably to the lowest obtainable vacuum prior to admitting a gas although the deposition process can be carried out over a wide range of flow conditions as described above in connection with the operation of apparatus 10 in FIGURE 1. Power is supplied to induction coil 31 to bring the temperature of enclosure 17, chamber 18, member 53 and chamber 54 up to a temperature in the range of 1700° C. to 2500° C. prior to admitting a gas. As described above, a carbonaceous gas, such as methane, is fed through feed line 21 and its associated opening 55 into chamber 54. The carbon vapor formed from the carbonaceous gas in chamber 54 is deposited on the interior wall of member 53 to produce a fine-grained pyrolytic graphite body. Effluent gases are exhausted through line 55.

After a pyrolytic graphite body in the order of 10 mils to 100 mils in thickness is deposited on the interior surface of member 53, the methane supply is discontinued. The temperature is increased gradually from the deposition range of 1700° C. to 2500° C. to a range of 2500° C. to 3400° C. Simultaneously, an inert gas, such as argon, is pumped from its gas source (not shown) through feed line 21 into the interior of member 53. This gas exerts a pressure against the interior surface of the pyrolytic graphite body subjecting the body to a large component of biaxial tension in the plane of deposition. The combination of the elevated temperature and pressure, which produces biaxially stressing of the body, transforms the pyrolytic graphite body to an annealed article with a more perfectly oriented structure. The pressure of the argon gas against the pyrolytic graphite body expands the body to fracture member 53 and separates the resulting article from the member. Additionally, it might be desirable to increase the rapidity of the fracture of member 53. This is accomplished by feeding hydrogen or an oxide gas from a gas source (not shown) through inlet line 57 into chamber 18 surrounding the exterior surface of member 53. In this manner, the gas from inlet line 57 reacts with member 53 to accelerate the fracture thereof during the expansion of the body on its interior surface. The gas flows and heat are discontinued and the apparatus is allowed to cool to room temperature. The pressure is increased to atmospheric pressure and covers 13 and 49 are removed to provide access to enclosure 17. The article is then removed.

Example of methods of forming a graphite membrane in accordance with the present invention are as follows:

*Example I*

An apparatus is set up in accordance with FIGURE 1 of the drawing wherein both the enclosure and the plates are composed of commercial graphite. The cover is affixed to the lower body portion and the chamber atmosphere is reduced to a pressure of 0.001 mm. of mercury by the pump. Power is supplied to the induction coil to heat the enclosure, members and passages to an uncorrected optical pyrometer temperature reading of about 2300° C. A carbonaceous gas in the form of methane is supplied at a rate of 33 cubic feet per hour through the feed line to the enclosure. The gas is formed into a carbon vapor in the enclosure which vapor is deposited uniformly on both the members and on the interior enclosure wall as it flows through the enclosure chamber at a pressure of approximately 18 mm. of mercury. After three hours, the power and gas flow are discontinued and the chamber is restored to atmospheric pressure. After cooling to room temperature, the chamber cover is removed. The plates, which are coated with a pyrolytic graphite body on both sides, are removed from the enclosure. A pyrolytic graphite body is then removed from each surface of each plate 25 and each body has a thickness of 70 mils.

One of the pyrolytic graphite bodies is machined to a configuration which is shown in FIGURE 2 of the drawing with an upper pair of apertures and a lower pair of apertures. A pair of identical cuts are made at approximately the mid-line on opposite edges of the body to provide a portion which will be transformed into an annealed graphite article. The pyrolytic graphite body is supported in an enclosure as shown in FIGURE 3 and placed in the apparatus disclosed in FIGURE 1. The body is subjected to a temperature of 3000° C. for one hour while a weight is applied to produce an initial load of 1000 pounds per square inch. The portion of the body produced by providing the adjacent cuts on opposite edges of the body is biaxially stressed by the application of the weight load thereto. The temperature is discontinued and the apparatus is allowed to cool to room temperature. The pyrolytic graphite body is removed from the enclosure. The portion of the body which is biaxially stressed during this operation at a temperature of 3000° C. is removed from the remaining portion of the body to provide an annealed graphite article with a more perfectly oriented structure.

*Example II*

An apparatus is set up in accordance with FIGURE 1 including the modified structure of FIGURE 4 wherein both the enclosure and the hollow closed end member with fine pores in the form of a tube are composed of commercial graphite. The procedure of Example I is followed until the deposition period of three hours is completed. At this time, the methane supply is discontinued but the temperature is increased gradually from the deposition temperature to a temperature of 3000° C. Argon gas is admitted to the interior of the hollow graphite tube having a pyrolytic graphite body of a thickness of 70 mils thereon. This gas is admitted under pressure for a period of 20 minutes whereby the gas diffuses through the pores of the graphite member and exerts a pressure against the interior surface of pyrolytic graphite body. The body, which is biaxially stressed at this elevated temperature, is forced away from the outer surface of the graphite member. The gas flow and heat are then discontinued. After the apparatus cools to room temperature, the chamber is restored to atmospheric pressure and the outer and inner covers are removed. The annealed graphite article with a more perfectly oriented structure is then removed from the enclosure.

*Example III*

Apparatus is set up in accordance with FIGURE 1 of the drawing including the modified structure of FIGURE 5 of the drawing wherein both the enclosure and the hollow closed end member with fine pores in the form of a tube are composed of commercial graphite. The procedure of Example I is repeated but the carbonaceous gas is fed into the interior of the graphite member and deposited on the walls thereof in the form of a 70-mil thick pyrolytic graphite body. After three hours, the methane supply is discontinued. Argon gas is then fed into the interior of the pyrolytic graphite body and exerts a pressure thereagainst to biaxially stress the body. The expansion of the pyrolytic graphite body fractures the graphite member. Hydrogen gas is fed into the chamber surrounding the exterior surface of the member whereby the gas reacts with the member to accelerate its fracture. The gas flows and temperature are then discontinued. After the apparatus has cooled to room temperature, the covers are removed to provide for removal of the annealed graphite article with a more perfectly oriented structure.

While other modifications of this invention and variation of method which may be employed in the scope of the invention have not been described, the invention is intended to include such that may be embraced within the following claims.

What I claim as new and desire to secure by Letters Patent of the United States is:

1. A method for forming an article which comprises: depositing a relatively thin body, having an inner major surface and an outer major surface at a temperature in the range of 1700° C. to 2500° C. on a surface of a hollow member having fine pores therethrough;
    said body being made of material selected from the group consisting of pyrolytic graphite and pyrolytic boron nitride;
heating said body to a temperature of at least 2500° C., and simultaneously exerting pressure of significant magnitude against the interior surface of said body to induce multiaxial tension within said body,
    said tension acting at least in part along axes displaced approximately 90° to each other, and said simultaneous pressure exertion and heating being continued for a period of time sufficient to transform said body to an annealed article of pronounced ductility.

2. A method for forming an article which comprises: depositing a relatively thin body, having a major inner surface and a major outer surface, at a temperature in the range of 1700° C. to 2500° C. on the exterior surface of a hollow member having fine pores therethrough;
    said body being made of material selected from the group consisting of pyrolytic graphite and pyrolytic boron nitride;
heating said body to a temperature of at least 2500° C., and
simultaneously therewith flowing an inert gas under pressure into the interior of said member, whereupon said gas diffuses through said porous member and exerts a pressure against the major inner surface of said body to induce multiaxial tension in said body,
    said tension acting at least in part along axes displaced approximately 90° to each other with said simultaneous flowing of gas under pressure and heating being continued for a period of time sufficient to transform said body to an annealed article of pronounced ductility.

3. A method for forming an article which comprises: depositing a relatively thin body, having a major inner surface and a major outer surface, at a temperature in the range of 1700° C. to 2500° C. on the interior surface of a fracturable hollow porous member with fine pores therethrough;
    said body being made of material selected from the group consisting of pyrolytic graphite and pyrolytic boron nitride;
heating said body to a temperature of at least 2500° C., and
simultaneously therewith flowing an inert gas under pressure into the interior of said body whereby pressure is exerted against the major inner surface of said body sufficient to cause fracturing of said hollow porous member and thereby inducing multiaxial tension in said body,
    said tension acting at least in part along axes displaced approximately 90° to each other to transform said body to an annealed article of pronounced ductility, and
separating said article from said member.

4. The method of claim 3 wherein a reactive gas is passed over the exterior surface of the hollow porous member during the step of exerting pressure in the interior of the body to accelerate the fracturing of said hollow porous member.

References Cited

UNITED STATES PATENTS 2,817,605   12/1957   Sanz _____ 23—209.3 X

OTHER REFERENCES

Proceedings of the Conferences on Carbon 1959, effective date Jan. 19, 1961, pp. 473–530, 537–546.

Proceedings of the Conference on Carbon 1957, effective date June 23, 1959, pp. 529–542.

NORMAN YUDKOFF, *Primary Examiner.*

GEORGE D. MITCHELL, A. J. ADAMCIK, S. J. EMERY, *Assistant Examiners.*